(12) United States Patent
Barbely et al.

(10) Patent No.: US 9,970,578 B2
(45) Date of Patent: May 15, 2018

(54) DYNAMIC LINER SLEEVE FOR FLEXIBLE COUPLING

(71) Applicant: American BOA, Inc., Cumming, GA (US)

(72) Inventors: Eric Barbely, Atlanta, GA (US); Rolf Janssen, Atlanta, GA (US); Srinivas Gade, Cumming, GA (US)

(73) Assignee: American BOA, Inc., Cumming, GA (US)

( * ) Notice: Subject to any disclaimer, the term of this patent is extended or adjusted under 35 U.S.C. 154(b) by 227 days.

(21) Appl. No.: 14/745,774

(22) Filed: Jun. 22, 2015

(65) Prior Publication Data

US 2016/0003388 A1 Jan. 7, 2016

Related U.S. Application Data

(60) Provisional application No. 62/020,096, filed on Jul. 2, 2014.

(51) Int. Cl.
| | |
|---|---|
| *F16L 27/11* | (2006.01) |
| *F16L 21/00* | (2006.01) |
| *F16L 51/02* | (2006.01) |
| *F01N 13/18* | (2010.01) |
| *F16L 27/111* | (2006.01) |
| *F16L 27/10* | (2006.01) |

(52) U.S. Cl.
CPC .......... *F16L 27/11* (2013.01); *F01N 13/1816* (2013.01); *F16L 21/00* (2013.01); *F16L 27/1004* (2013.01); *F16L 27/111* (2013.01); *F16L 51/025* (2013.01); *F16L 51/026* (2013.01); *F16L 51/027* (2013.01)

(58) Field of Classification Search
CPC ....... F16L 27/11; F16L 51/026; F16L 51/027; F16L 51/025; F16L 27/111
USPC ............................... 285/222.5, 226
See application file for complete search history.

(56) References Cited

U.S. PATENT DOCUMENTS

| | | | |
|---|---|---|---|
| 5,660,419 A * | 8/1997 | Kim ..................... | F16L 27/111 285/226 |
| 6,062,268 A * | 5/2000 | Elsasser ................ | F16L 27/111 181/228 |
| 6,230,748 B1 | 5/2001 | Krawietz et al. | |
| 8,453,680 B2 | 6/2013 | Weiss et al. | |

(Continued)

FOREIGN PATENT DOCUMENTS

| | | |
|---|---|---|
| DE | 202006008811 U1 | 8/2006 |
| DE | 202008008290 U1 | 10/2009 |

(Continued)

OTHER PUBLICATIONS

International Searching Authority, Search Report and Written Opinion Issued in Corrsponding International Application No. PCT/IB2015/001046 dated Oct. 5, 2015, 10 pages.

*Primary Examiner* — David Bochna
(74) *Attorney, Agent, or Firm* — David S. Stallard (57) ABSTRACT

A flexible coupling includes a liner, a bellow, and a liner sleeve preferably defined by a compressed woven mesh strip spirally wound around the liner between the bellow and liner and moveable longitudinally with respect to the bellow and liner when the coupling expands linearly. An alternate sleeve in the form of a cylinder is disposed about the liner, under the bellow and is formed of a woven non-compressed mesh.

5 Claims, 9 Drawing Sheets (56) References Cited

U.S. PATENT DOCUMENTS

| | | | |
|---|---|---|---|
| 8,844,579 B2* | 9/2014 | Eguchi | F16L 51/027 285/226 |
| 2008/0012297 A1* | 1/2008 | Heil | F16L 27/11 285/226 |
| 2011/0074147 A1* | 3/2011 | Thomas | F16L 51/026 285/226 |
| 2012/0056414 A1* | 3/2012 | Thomas | F16L 51/026 285/49 |
| 2013/0015652 A1* | 1/2013 | Thomas | F16L 51/026 285/226 |
| 2015/0204470 A1* | 7/2015 | Kim | F16L 27/111 285/226 |

FOREIGN PATENT DOCUMENTS

| | | | | |
|---|---|---|---|---|
| DE | 102010037162 A1 | | 3/2011 | |
| DE | 102011110147 A1 | | 2/2013 | |
| EP | 0493680 A1 | | 7/1992 | |
| EP | 0974741 A1 | * | 1/2000 | ............ F16L 27/111 |
| EP | 2302275 A1 | | 3/2011 | |

* cited by examiner

DYNAMIC LINER SLEEVE FOR FLEXIBLE COUPLING

PRIORITY CLAIM

Applicant claims the benefit of the filing date of U.S. Provisional Patent Application Ser. No. 62/020,096, filed Jul. 2, 2014, which application is expressly incorporated herein by reference.

FIELD OF THE INVENTION

This invention relates to flexible couplings used for coupling tubes and pipes and more particularly to flexible couplings used in exhaust systems for internal combustion engines, other harsh, corrosive applications and the like.

BACKGROUND OF THE INVENTION

In flexible exhaust couplings used behind a diesel engine (on-highway and off-highway) there are observed high failure rates of the couplings. The nature of the diesel engine creates a very severe NVH (noise, vibration, harshness) environment which is detrimental to adjacent components and more specifically the flexible coupling in the exhaust system. Such systems typically have a low spring stiffness bellow having a low natural frequency that easily aligns with the vibration profile of the application's diesel engine. That leads to accelerated fatigue and abrasion failure. In addition, increasing government-mandated emission requirements mandate the use of ATD's (after treatment devices) in diesel exhaust systems. Such ATDs typically include at least two functional components, a diesel particulate filter (DPF) and a Selective Catalytic Reduction (SCR). With regard to the DPF, elevated exhaust temperatures are required to periodically clean it. Gas temperature loss in any system flexible coupling renders this process less efficient. Thus undesirable temperature losses in the prior couplings reduce the system's efficiency in cleaning periodically. Respecting the SCR, the chemical conversion of undesirable NOx to non-harmful chemicals like $N_2$, $H_2O$ and $CO_2$ requires high temperatures such as in the range of 357° C. and 447° C. Exhaust gas temperature loss in prior flexible couplings renders the conversion less efficient. Thus it is desired to reduce loss of exhaust gas temperatures across flexible couplings used in such exhaust systems and to increase the efficiency of the ATD systems in order to meet federal emission standards.

Others have interposed materials between a bellow and a liner to reduce thermal loss and wear in the coupling. Nevertheless, such prior efforts as are known are limited to static spacers which cannot move dynamically, or which are positively connected to the bellow, or of static length, thereby of limited dynamic effect as the bellows and liner move from one configuration to another due to thermal, dynamic or assembly stresses in the coupling.

Figure 7:
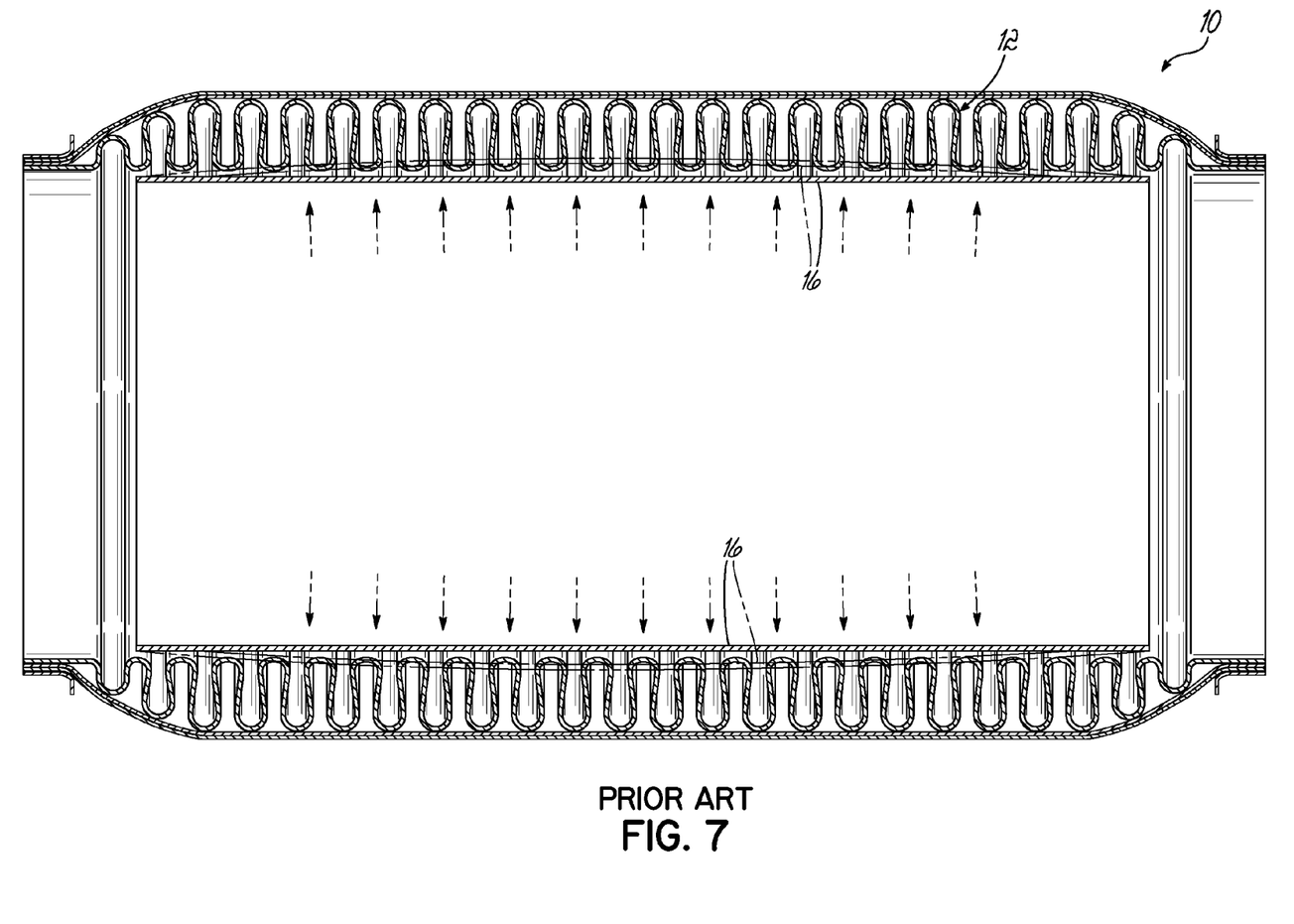
FIG. 7 is a sketch illustrating prior art without the benefit of the invention and illustrating problematic direct liner-to-bellows contact.

Such prior efforts, for example are described in U.S. Patent Publication No. US 2011/0074147; U.S. Pat. No. 8,453,680; German Patent document DE 10 2011 110 147 A1; and German Patent document DE 20 2006 008 811 U1, incorporated herein as background. See also FIG. 7 illustrating prior structures wherein liner movement allows direct, undesirable contact.

It is thus one objective of this invention to provide an improved coupling with reduced failure rates, reduced NVH and reduced thermal heat loss from liner to bellow, with increased thermal heat retention inside the coupling.

A further objective of the invention has been to provide a coupling of liner and bellow configuration with a dynamic feature providing beneficial function to a degree not shown or suggested in known prior art.

SUMMARY OF THE INVENTION

A preferred embodiment of this invention includes a continuous, axial spiral-pattern wound metal or non-metal sleeve around a typical liner and interposed in the coupling between a bellow and a bellow liner. The coupling is preferably used for connecting ends of two conduits or pipes and preferably pipes in an engine exhaust system. This sleeve is fully flexible and free to move dynamically in 6 degrees of freedom so it does not restrict motion of the bellow or bellow liner or other surrounding components. It functions as an insulator against internal heat transfer between the liner and the bellow as well as prevents liner to bellow contact as a result of thermally or stress induced movement. The sleeve also dampens natural vibration or frequencies of the bellow thus reduces NVH and increases bellow fatigue durability. Most importantly, it also prevents bellow to liner contact abrasion in harsh NVH environments (when high g-loads are applied to the flexible coupling).

Beneficially, the sleeve, even as it moves, maintains separation of the bellows and liner. An air gap is preferably but not always maintained between the sleeve and the bellow; the sleeve functions to dampen the bellow when contacting it, and to dampen the liner as well.

In restricting the loss of high exhaust gas temperatures, the invention increases the efficiency of ATD's used in exhaust gas systems having couplings according to the invention.

DETAILED DESCRIPTION OF THE INVENTION

Figure 1:
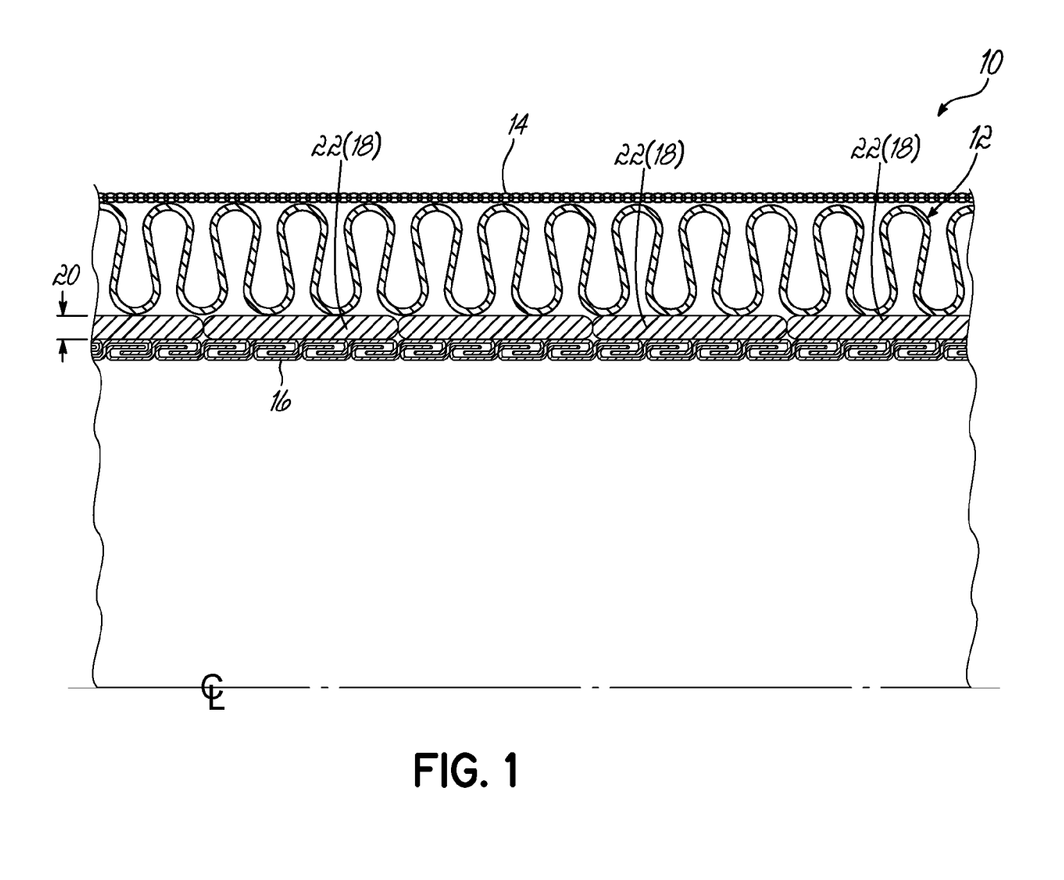
FIG. 1 is an illustrative diagram in a longitudinal cross-section of the invention illustrating the liner sleeve in place between a coupler liner and bellows in an axially compressed state.
Figure 2:
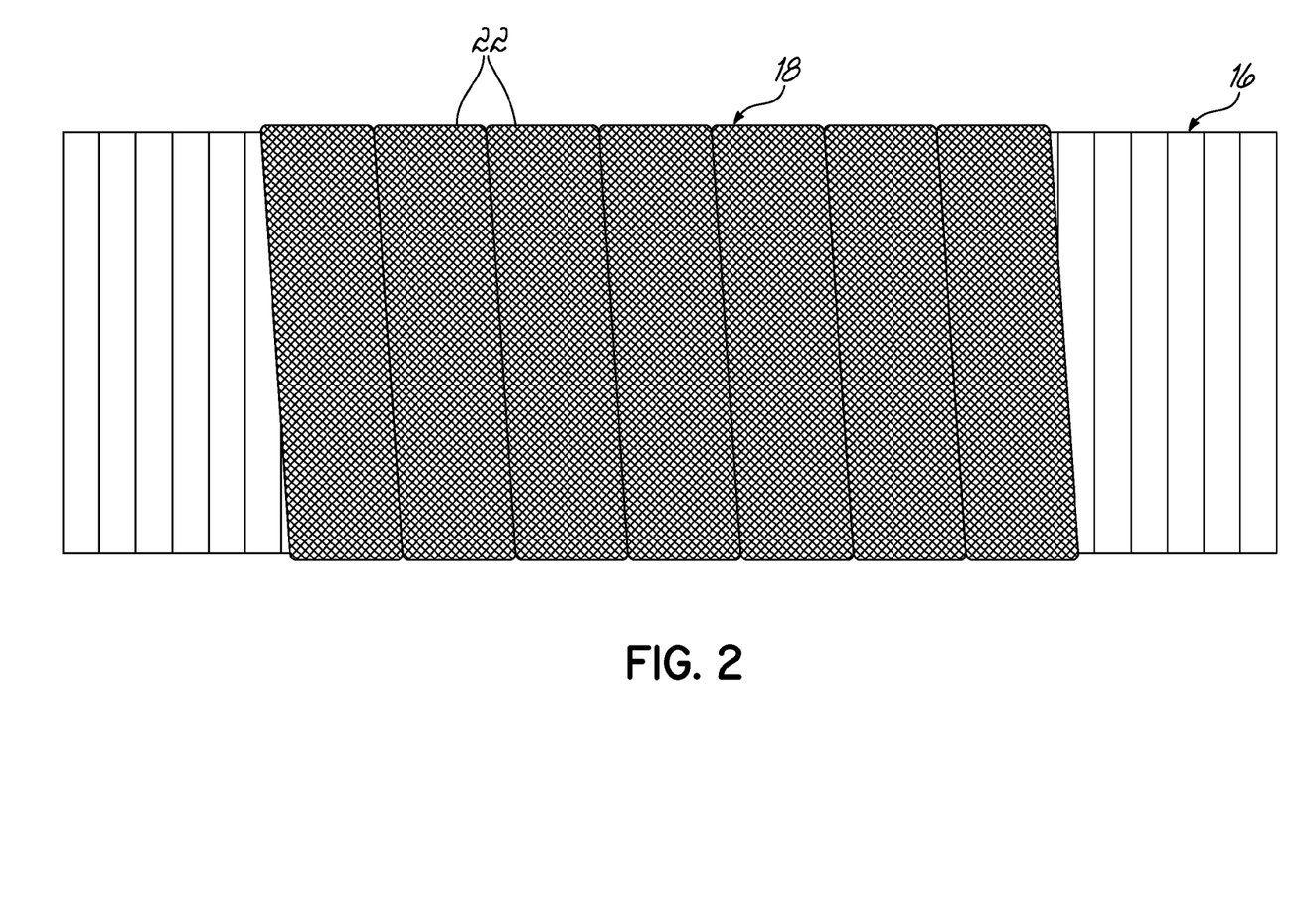
FIG. 2 is an illustration of the invention showing the liner and liner sleeve in a compressed at rest state and with bellow omitted for clarity.

Turning to FIGS. 1 and 2, a partial cross-section of a flexible coupling 10 according to the invention is disclosed about a center line CL, defining an elongated coupling axis.

Figure 1A:
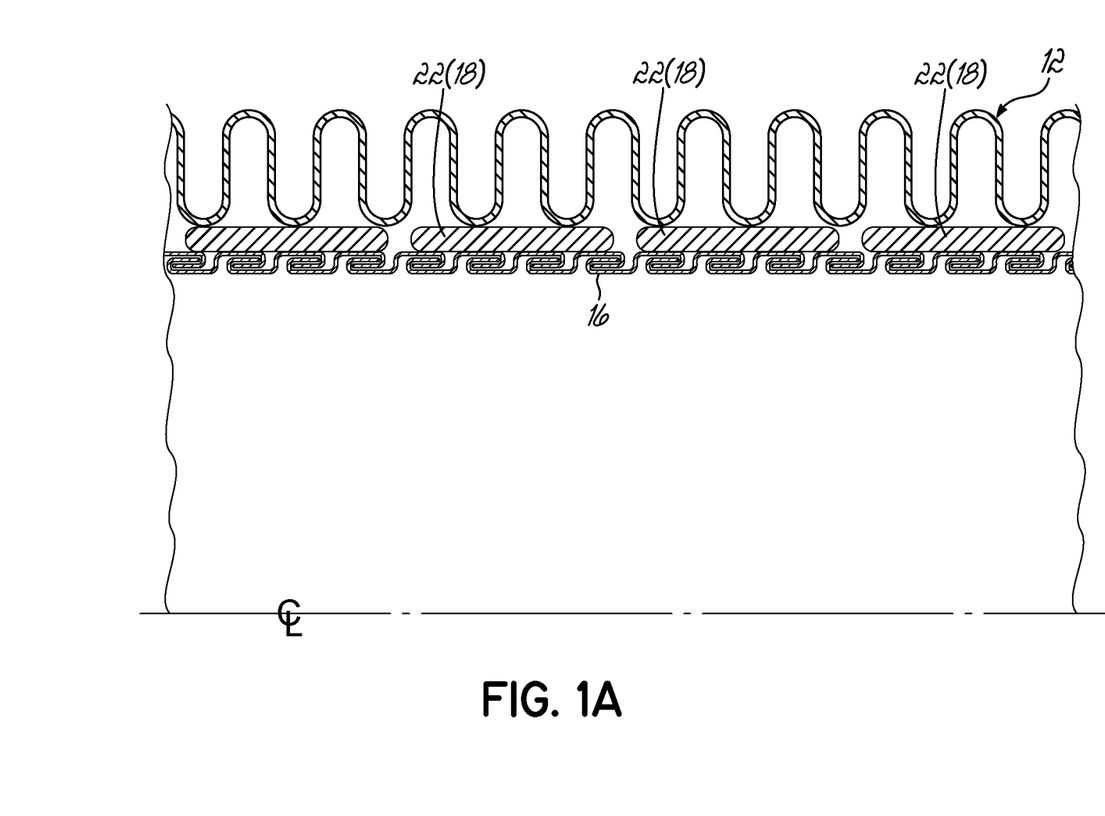
FIG. 1A is an illustration like FIG. 1 but omits the outer braid for clarity and further illustrates a slightly expanded liner, liner sleeve and bellow than in FIG. 1.

A convoluted, flexible bellow 12 (sometimes referred to as "bellows") is covered externally by a braided outer sleeve 14 as typical in the industry. The coupling 10 is provided with an internal liner 16 extending axially and internally of coupler 10 as shown and, finally, according to the invention, a flexible, dynamic liner sleeve 18 is spirally wound about liner 16. Liner 16 is preferably formed from an interlocked strip as indicated in FIG. 1A.

It will be appreciated that in the past, liner 16 and bellow 12 could be adjacent and could touch (see FIG. 7). Respective vibration could occur between the two, causing contact abrasion, producing noise, heat conduction and other undesirable artifacts.

According to the invention, spiral wound liner sleeve 18 is disposed about the liner 16, providing several unique benefits. First, the liner sleeve 18 separates and spaces the liner 16 from bellow 12, sleeve 18 thus preferably maintaining an air gap (20 in FIG. 1) between the bellow 12 and liner 16. Noise and vibration are eliminated, while heat conduction between these parts is reduced. As well, the sleeve 18 functions to dampen the liner whether or not it contacts the bellow.

The liner sleeve 18 can be manufactured as an integral woven sleeve 38 as applied to the liner 16 (FIG. 6) or preferably as an axially extending spiral wrap in the form of an elongated strip 22 as in FIGS. 2, 2A, 3, 4 and 5 with elongated edges abutting (or separating as shown). In this condition, strip 22 of sleeve 18 is typically made of interconnected longitudinally expansible ribbons known as mesh and, is relatively compressed or collapsed such as in calendared mesh. Strip 22 is wrapped about the liner 16 preferably in a spiral or helix pattern with edges here (FIGS. 2 and 2A) touching with the coupling in a compressed state. Strip 22 may be spot welded at strip end points 22a, 22b as indicated at "x" in FIG. 2A and only allowing movement in the wrap 18 between the welded strip 22 end points 22a, 22b. It will be appreciated that FIGS. 2-5 show only the liner 16 and sleeve 18 of the coupling 10 with bellow 12 omitted for clarity.

Figure 3:
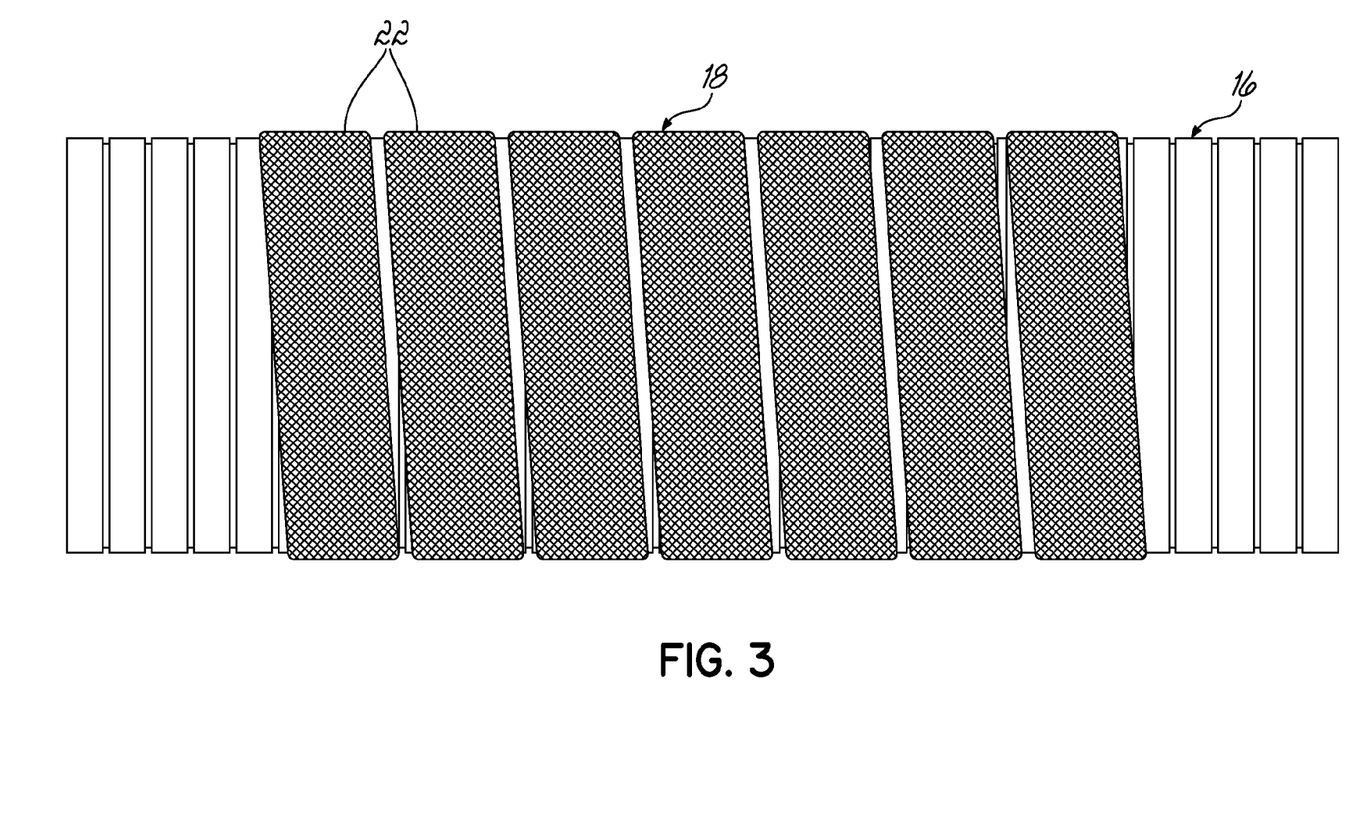
FIG. 3 is an illustration of the invention similar to FIG. 2 but showing the liner and liner sleeve in an axially extended state (omitting the bellow for clarity)

In FIG. 3, as well as in FIG. 1A, the liner 16 is shown extended or expanded as it would be if the coupling 10 were extended. In this condition, the spiral wrap 22 of liner sleeve 18 is expanded in a spaced or open spiral pattern as in FIGS. 3-5 with spaces between certain of the elongated edges of the strip wrap 22. Alternate expansion and contraction in the coupling 10 by reason of thermal or other forces is attended by expansion and contraction of coupling 10 as described above. When the liner 16 expands, the spirally wrapped sleeve 18 also expands into the more open spiral pattern of FIG. 3, for example.

Figure 4:
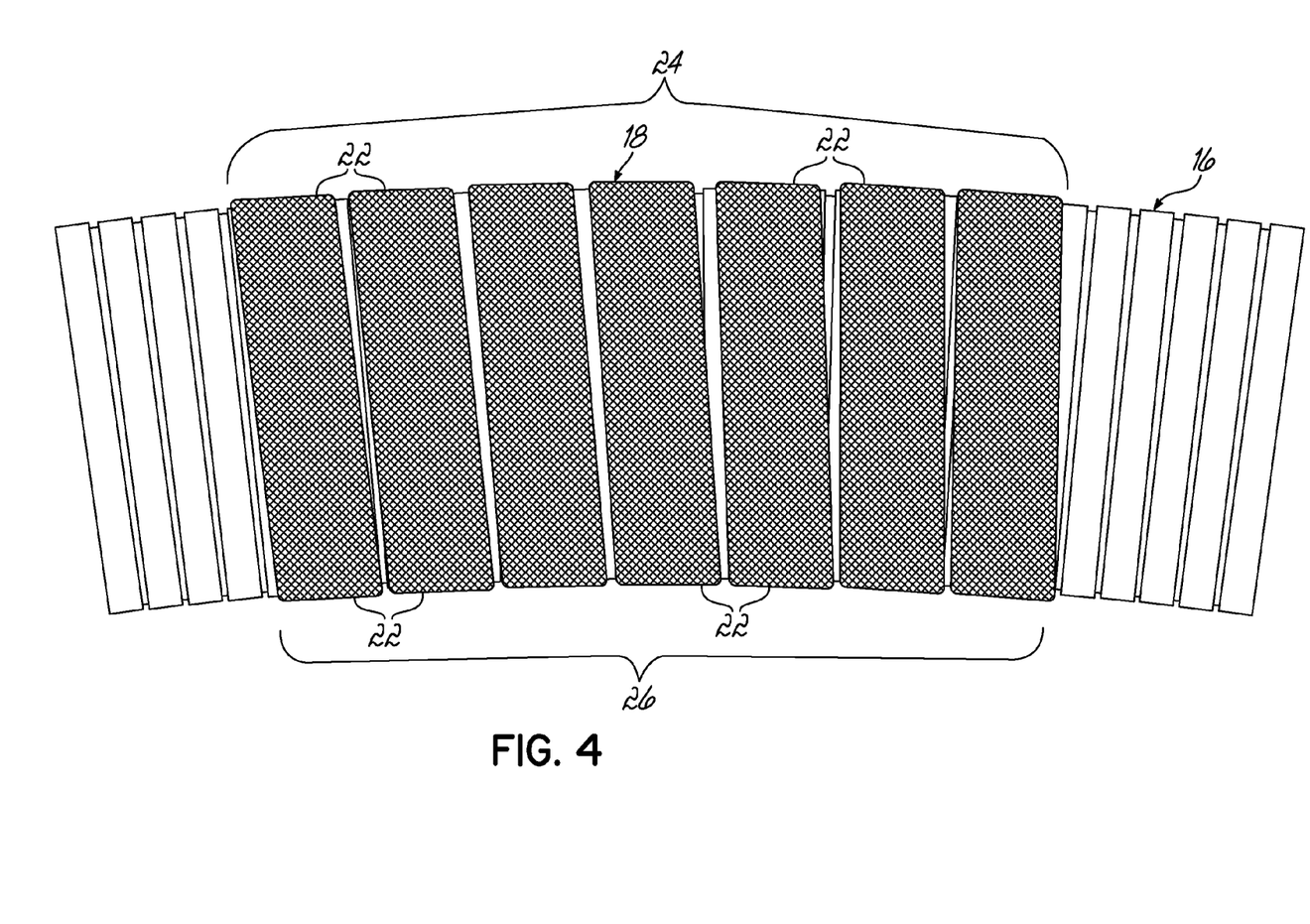
FIG. 4 is an illustration of the invention showing the liner and liner sleeve in a bent or an angular state (omitting the bellow for clarity)

In FIG. 4, the coupling 10 and liner 16 is shown in bent, angled or curved configuration. When liner 16 bends, liner sleeve 18 bends with it so that an outer portion of the liner sleeve wrap 22 is pulled apart, through area 24, while internal part of liner sleeve 18 and wrap 22 is urged together as at 26.

Figure 5:
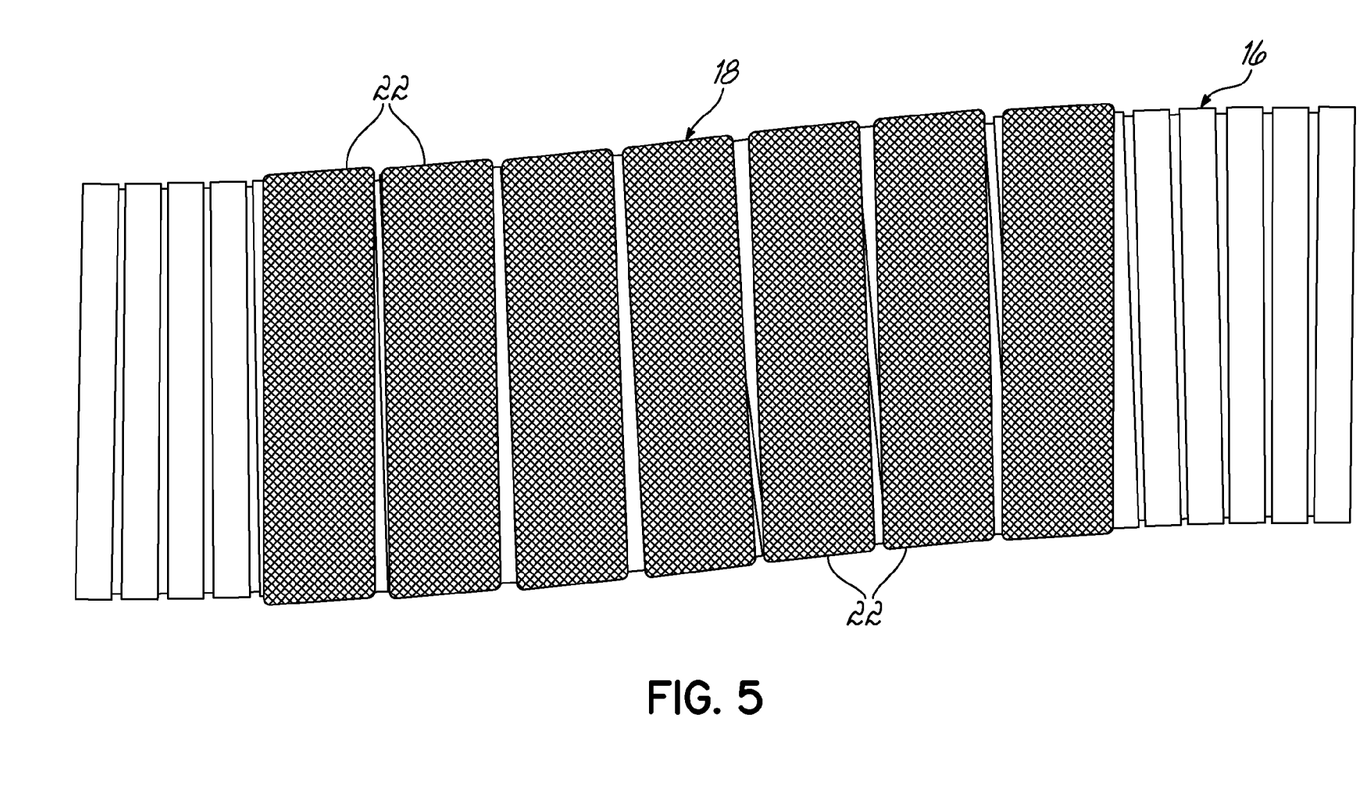
FIG. 5 is an illustration of the invention showing the liner and liner sleeve in a lateral angular state such as where the coupling ends are oriented about offset axes (and omitting the bellow for clarity)

In FIG. 5, the coupling is laterally displaced with the liner 16 generally following the bellows in an "S"-shape, such as to accommodate off-set axes of adjacent components at respective coupler ends. Here, liner sleeve 18 moves with the liner 16 in a general "S"-shaped configuration, with the liner sleeve taking on a dual curve, such as the single curve in FIG. 4, and the wrap strip 22 separating along its elongated edges in the outer or convex areas of the curved liner.

As illustrated in FIGS. 4 and 5, liner sleeve 18 (and its strip 22) moves in a radial direction as the coupling moves radially with respect to it's at rest longitudinal axis upon angular bending or displacement.

Since ends of the strip 22 of sleeve 18 (FIG. 2A) are secured at the end points 22a, 22b only via resistance spot welds at x, the liner sleeve 18 is not permanently fixated to liner 16 between these end points, thus allowing low force flexibility and dynamic liner sleeve movement.

In this way, the liner sleeve 18 performs as noted maintaining separation of liner 16 and bellows 12, with or without an insulating air gap 20 therebetween, nevertheless remaining dynamic and bending as loads are applied to the coupling in compression, tension, lateral or angular vectors.

From the FIGS. such as 1A and 3-5, it will be appreciated that liner sleeve 18 strip portions 22 have moved longitudinally with respect to both bellow 12 and liner 16 as the coupling has expanded. This movement adds significantly to the dynamic performance of liner sleeve 18 in the coupling reducing NVH and in the maintenance of preferred air gap 20.

Figure 6:
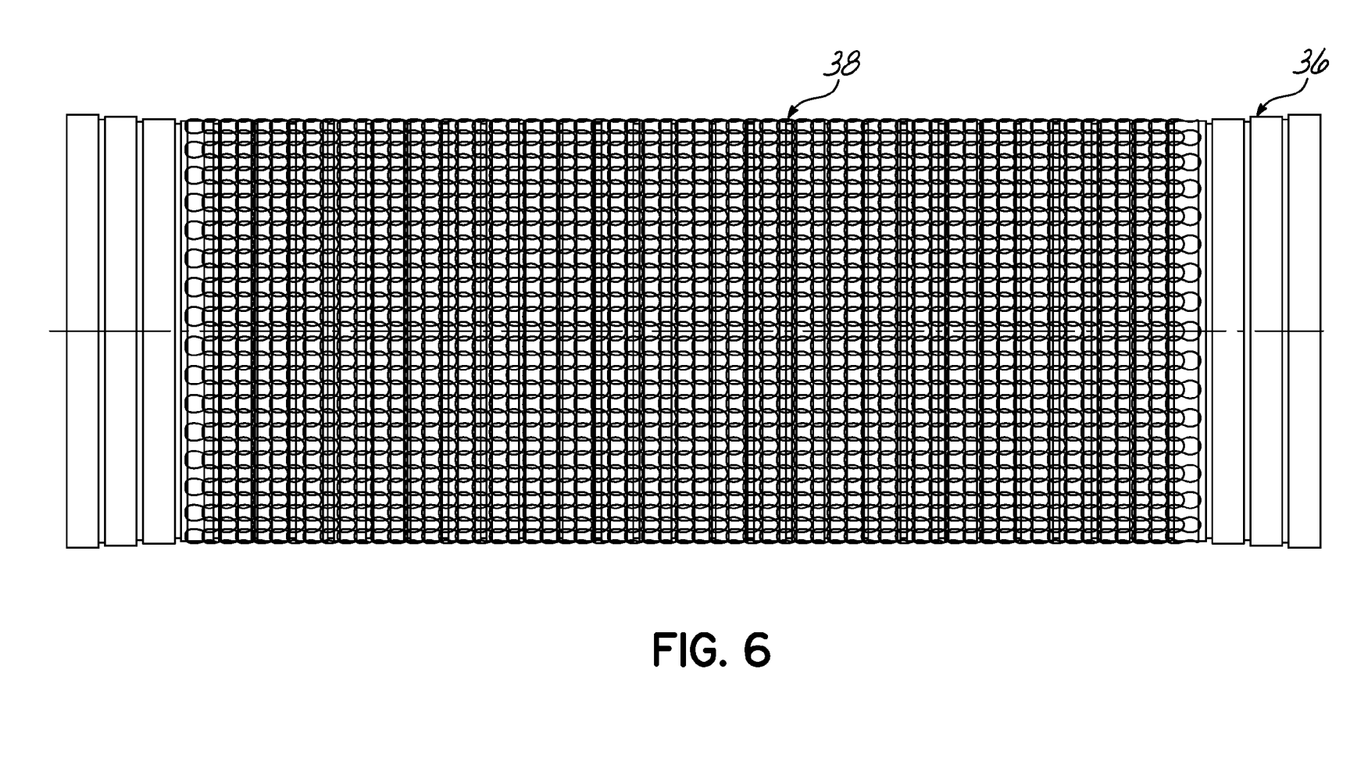
FIG. 6 is an illustration of an alternate liner sleeve for a coupling with bellow omitted for clarity.

Also it is to be appreciated that the invention provides significantly reduced EGT loss across the coupling while at the same time providing the dynamic performance of movement and component separation as described herein FIG. 6 illustrates an alternative embodiment of the invention as mentioned above (bellow omitted for clarity) wherein a flexible dynamic liner integral sleeve 38 (rather than strip 22) is disposed over a liner 36 for use in a bellow coupling as above. In this embodiment, sleeve 38 is in the form of a continuous cylinder of linked portions of conventional mesh material comprising a woven metallic fabric sleeve. Further describing sleeve 38, the mesh applies a radial load on the liner effectively dampening the liner from vibration as well as providing contact prevention between the liner and the bellow. This sleeve 38 also moves longitudinally with respect to bellow and liner when the coupling is extended, and radially with the coupling when it is angled or bent, with only ends of sleeve 38 fixed to liner 16.

Moreover, and for both embodiments, it will be appreciated that the liner sleeve 18 (38) is not positively secured to the bellow between the sleeve ends and is preferably secured to the liner 16 (36) only at the sleeve ends. Thus the liner sleeve relative to bellow 12 and to liner 16 (36) is free to move axially at least between opposite ends of sleeve 18 (38) providing a very beneficial dynamic to prevention of liner to bellow contact, maintenance of an air gap between bellow and liner even with gaps in strip 22, and in prevention and reduction of NVH.

Also it will be appreciated the liner sleeve 18 (38) is moveable between its ends in a direction parallel to the longitudinal axis of the coupling and with respect to both the bellow and the liner. The liner sleeve 18 is also moveable in a radial direction when the coupling moves radially as when angled or bent.

Thus, while of different construction, sleeve 38 provides the same functions in a coupling as liner sleeve 18 described above.

Figure 2A:
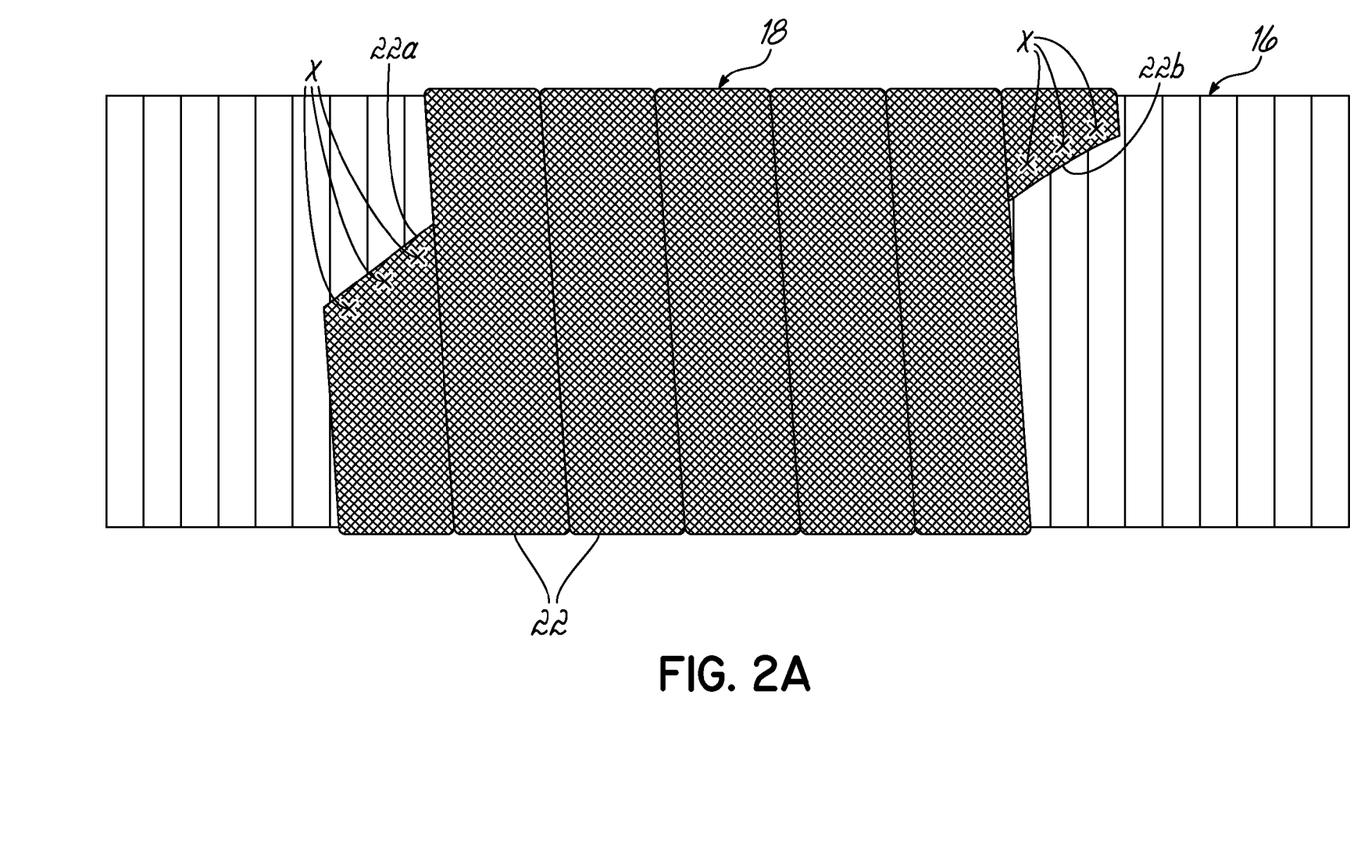
FIG. 2A is an illustration in side view of the invention as in FIG. 2 but illustrates the spot welding of the sleeve at its ends.

Finally, and with attention to the FIGURES, it will be appreciated that the coupling of the invention is illustrated in FIGS. 1, 2, and 2A in an axially compressed state. While the same coupling is illustrated in FIGS. 1A and 3, for example, in a somewhat axially compressed state, a coupling according to the invention may be provided in a static state condition between these two states, or in the more "open" state of FIGS. 1A and 3, thereby allowing axial compression or extension when the coupling is installed, for example, in a hot gas exhaust system, the depiction in the FIGS. not being to an exacting scale but depicted for clarification and descriptive purposes.

These and other modifications and advantages will be readily appreciated by those of ordinary skill in the art without departing from the scope of the invention and applicant is bound only by the claims appended hereto.

What is claimed is:

1. A flexible coupling for connecting first and second pipes, said flexible coupling comprising:
    a flexible liner having an elongated axis;
    a flexible bellow oriented radially around said flexible liner;
    a flexible liner sleeve interposed between said flexible liner and said bellow;
    said flexible liner sleeve comprising a flexible strip wound spirally about said flexible liner;
    said flexible strip having adjacent elongated edges and strip ends;
    said flexible strip being moveable in a direction parallel to said axis with respect to both said bellow and said flexible liner; and
    said flexible liner sleeve comprising an elongated metallic mesh in the flexible configuration of a cylinder and said strip ends of said flexible strip spot welded to said flexible liner.

2. A flexible coupling as in claim 1 wherein said flexible liner sleeve is moveable radially in a direction of movement with radial movement of said axis.

3. A flexible coupling as in claim 1 wherein edges of said flexible strip of said flexible liner sleeve are abutting when the coupling is compressed and are at least spaced apart along portions of said flexible liner sleeve upon one of elongating and bending of said flexible coupling.

4. A flexible coupling as in claim 1 having an air gap between said flexible liner sleeve and said bellow.

5. A flexible coupling as in claim 1 wherein one side of said flexible liner sleeve engages said liner and another side of said flexible liner sleeve engages portions of said bellow.

* * * * *